United States Patent
Yang

(10) Patent No.: US 11,968,719 B2
(45) Date of Patent: Apr. 23, 2024

(54) METHOD AND DEVICE FOR REPORTING INFORMATION AND METHOD AND DEVICE FOR RECEIVING REPORT INFORMATION

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 564 days.

(21) Appl. No.: 17/166,691

(22) Filed: Feb. 3, 2021

(65) Prior Publication Data

US 2021/0160930 A1    May 27, 2021

Related U.S. Application Data

(63) Continuation of application No. PCT/CN2019/093863, filed on Jun. 28, 2019.
(Continued)

(51) Int. Cl.
*H04W 24/10* (2009.01)
*H04L 41/0677* (2022.01)
(Continued)

(52) U.S. Cl.
CPC ..... *H04W 74/0833* (2013.01); *H04L 41/0677* (2013.01); *H04L 43/08* (2013.01); *H04W 24/10* (2013.01); *H04W 76/19* (2018.02)

(58) Field of Classification Search
CPC . H04W 74/0833; H04W 24/10; H04W 76/19; H04W 36/0072; H04L 41/0677; H04L 43/08
See application file for complete search history.

(56) References Cited

U.S. PATENT DOCUMENTS

| | | | |
|---|---|---|---|
| 2015/0245402 A1* | 8/2015 | Mochizuki | H04W 36/22 370/328 |
| 2016/0066242 A1* | 3/2016 | Su | H04W 36/0085 455/436 |

(Continued)

FOREIGN PATENT DOCUMENTS

| | | |
|---|---|---|
| CN | 103856980 A | 6/2014 |
| CN | 107079500 A | 8/2017 |
| WO | 2017135803 A1 | 8/2017 |

OTHER PUBLICATIONS

Extended European Search Report for EP Application 19852749.1 dated Sep. 17, 2021. (10 pages).
(Continued)

*Primary Examiner* — Syed Ali
(74) *Attorney, Agent, or Firm* — Young Basile Hanlon & MacFarlane, P.C.

(57) ABSTRACT

A method and device for reporting information and a method and device for receiving report information are provided. The method for reporting information includes: storing, by a terminal device, resource information of a random access channel (RACH) on which access of the terminal device to a network has abnormality; and reporting, by the terminal device, the resource information to a network device.

14 Claims, 3 Drawing Sheets

Related U.S. Application Data

(60) Provisional application No. 62/720,745, filed on Aug. 21, 2018.

(51) Int. Cl.
*H04L 43/08* (2022.01)
*H04W 74/0833* (2024.01)
*H04W 76/19* (2018.01)

(56) References Cited

U.S. PATENT DOCUMENTS

| | | | | |
|---|---|---|---|---|
| 2016/0112924 | A1* | 4/2016 | Turakhia | H04W 36/305 370/332 |
| 2017/0303265 | A1* | 10/2017 | Islam | H04B 7/0639 |
| 2017/0359765 | A1* | 12/2017 | Chincholi | H04L 43/16 |
| 2018/0206170 | A1* | 7/2018 | Nagaraja | H04W 16/28 |
| 2019/0141557 | A1* | 5/2019 | da Silva | H04B 7/0619 |
| 2019/0254064 | A1* | 8/2019 | Islam | H04W 56/001 |

OTHER PUBLICATIONS

Qualcomm Incorporated, Remaining Details on RACH Procedure, 3GPP TSG-RAN WGI Meeting RANI AH 1801, RI-1800851, Jan. 22-Jan. 26, 2018. (12 pages).

International Search Report for PCT/CN2019/093863 dated Sep. 30, 2019.

3GPP TSG RAN WG1 Meeting #88b; Spokane, Washington, USA, Apr. 3-7, 2017; R1-1705325.

3GPP TSG-RAN WG2 Meeting #67bis; Miyazaki, Japan, Oct. 12-16, 2009; R2-095443.

3GPP TSG-RAN WG2 #99bis; Prague, Czech Republic, Oct. 9-13, 2017; R2-1710082.

Communication pursuant to Article 94(3) EPC for EP Application 19852749.1 dated Jul. 6, 2023. (5 pages).

* cited by examiner

METHOD AND DEVICE FOR REPORTING INFORMATION AND METHOD AND DEVICE FOR RECEIVING REPORT INFORMATION

CROSS-REFERENCE TO RELATED APPLICATION(S)

The present application is a continuation application of International Application No. PCT/CN2019/093863, filed on Jun. 28, 2019, which claims priority to U.S. provisional application No. 62/720,745, filed on Aug. 21, 2018. The present application claims priority and the benefit of the above-identified applications and the above-identified applications are incorporated by reference herein in their entireties.

TECHNICAL FIELD

The present disclosure relates to the communication field, and more particularly, to a method and device for reporting information, and a method and device for receiving report information.

BACKGROUND

In communication systems, a terminal device may perform a random access procedure to establish a connection with a cell and obtain uplink synchronization. During the random access procedure, the terminal device may send a random access preamble on a random access channel (RACH). In communication systems such as a New Radio (NR) system, there may be multiple beams in a cell, and those beams are visible to terminal devices. When a terminal device encounters a beam failure, it may send a beam failure recovery request to a base station for beam failure recovery, and the beam failure recovery request may be sent on the RACH.

RACH resources typically include contention free RACH resources and contention based RACH resources. When a terminal device performs an operation such as beam failure recovery or handover, a network device may provide both contention free RACH resources and contention based RACH resources to the terminal device, and the contention free RACH resources may be associated with any one or more synchronization signal block/channel state information reference signal (SSB/CSI-RS) indexes.

SUMMARY

Implementations of the present disclosure provide a method and device for reporting information, and a method and device for receiving report information.

In one aspect, a method for reporting information is provided. The method may include: storing, by a terminal device, resource information of a random access channel (RACH) on which access of the terminal device to a network has abnormality; and reporting, by the terminal device, the resource information to a network device.

In another aspect, a method for receiving report information is provided. The method may include: receiving, by a network device, resource information of an RACH on which access of a terminal device to a network has abnormality, reported by the terminal device.

In yet another aspect, a terminal device is provided. The terminal device may include a storage unit, configured to store resource information of an RACH on which access of the terminal device to a network has abnormality; and a transceiving unit, configured to report the resource information to a network device.

In still another aspect, a network device is provided. The network device may include a transceiving unit, configured to receive resource information of an RACH on which access of a terminal device to a network has abnormality, reported by the terminal device A better understanding of the nature and advantages of implementations of the present disclosure may be gained with reference to the following detailed description and the accompanying drawings.

DETAILED DESCRIPTION

Figure 1:
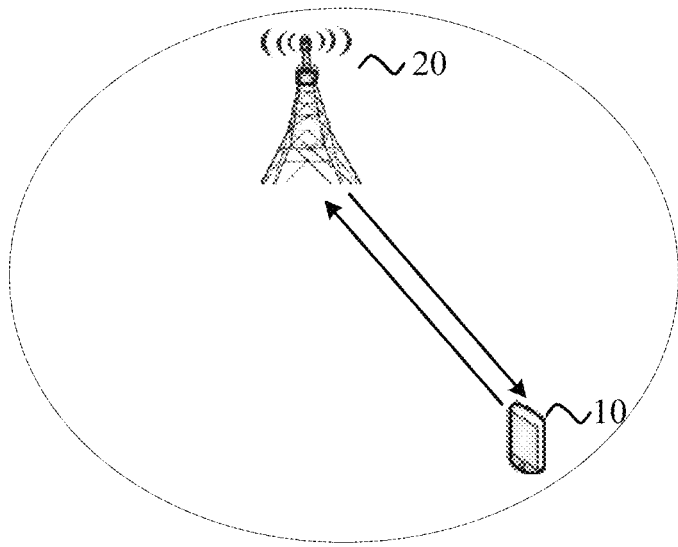
FIG. 1 is a schematic diagram of an exemplary application scenario where an implementation of the present disclosure may be applied.

The technical solutions of exemplary implementations of the present disclosure will be described below with reference to the accompanying drawings. It should be understood that the exemplary implementations are intended for better understanding of the technical solutions of the present disclosure, rather than limiting the scope of the application, and skilled artisans would understand that the exemplary implementations and features herein may be combined according to actual needs.

The acts shown in the flowchart of the accompanying drawings may be performed at least in part by a computer system storing a set of computer-executable instructions. In addition, although a logical sequence is shown in the flowchart, in some cases the acts shown or described may be performed in a different sequence, or some acts may not be performed at all.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) system or 5G system, or a further communication system.

A terminal device in implementations of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in a 5G network, or a terminal device in an evolved public land mobile network (PLMN), etc., which are not restricted in the implementations of the present disclosure.

A network device in implementations of the present disclosure may be a device for communicating with a terminal device, and the network device may be a Base Transceiver Station (BTS) in the GSM or CDMA system, a NodeB (NB) in the WCDMA system, an evolved base station (eNB or eNodeB) in the LTE system, or a wireless controller in a Cloud Radio Access Network (CRAN) scenario, or the network device may be a relay station, an access point, an on-board device, a wearable device, a network device in a 5G network, or a network device in an evolved PLMN, etc., which are not restricted in the implementations of the present disclosure.

FIG. 1 shows a schematic diagram of an exemplary application scenario where an implementation of the present disclosure may be applied. A communication system shown in FIG. 1 may include a terminal device 10 and a network device 20. The network device 20 is configured to provide a communication service for the terminal device 10 and is connected to a core network (not shown). The terminal device 10 accesses the network by searching for a synchronization signal, or a broadcast signal, etc., transmitted by the network device 20 to communicate with the network. Arrows shown in FIG. 1 may indicate uplink/downlink transmission through cellular links between the terminal device 10 and the network device 20.

When a terminal device performs beam failure recovery in a cell where there are multiple beams, or performs handover, a network device may provide both contention free RACH resources and contention based RACH resources to the terminal device. However, abnormality may occur during the access of the terminal device to the network. For example, it may be possible that a terminal device attempts to access the network via contention free RACH resources linked to specific SSB/CSI-RS configured in handover or beam failure recovery case, but does not succeed, and according to a predefined specification or standard, the terminal device tries the contention based RACH resources configured, or tries other contention free RACH resources, but succeeds. Or it may be possible that although the terminal device can access the network via contention free RACH resources linked to specific SSB/CSI-RS, the terminal device immediately switches to another beam, or switches to another beam in a very short time. Another case would be when a terminal device accesses the network via contention free and/or contention based RACH resources, Radio Link Failure (RLF) happens immediately, or happens in a very short time. This can happen because the RACH resource is associated with beam level parameters, such as SSB/CSI-RS index.

It may be desirable for the network device to be aware of information about the RACH resources related to the abnormality, so that the network device may, for example, adjust or improve the configuration of the RACH resources to improve the efficiency and/or effectiveness of the access of the terminal device to the network.

Herein, it should be understood that the operations of beam failure recovery and handover mentioned in the disclosure are taken as mere examples, and skilled artisans would appreciate that the technical solutions provided in the present disclosure may as well be applied to other operations for accessing a network via RACH resources.

Figure 2:
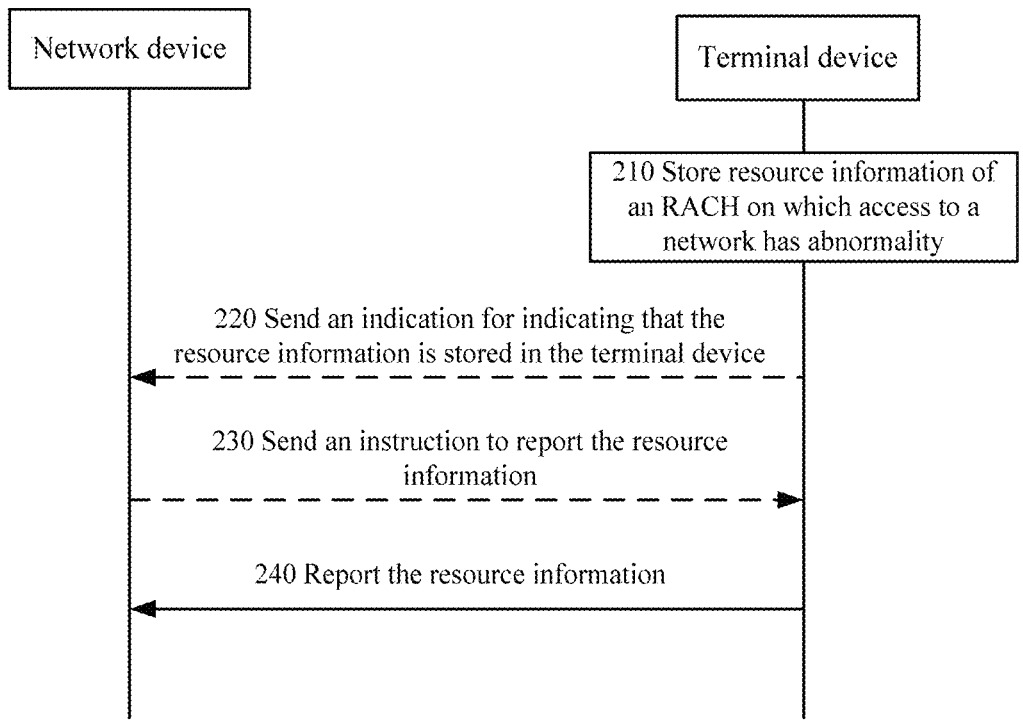
FIG. 2 is a schematic diagram of interaction between a terminal device and a network device according to an exemplary implementation of the present disclosure.

FIG. 2 shows a schematic diagram of interaction between a terminal device and a network device according to an exemplary implementation of the present disclosure. As shown in FIG. 2, the interaction may include actions 210 and 240.

In action 210, the terminal device stores resource information of a random access channel (RACH) on which access of the terminal device to a network has abnormality.

In an exemplary implementation, the abnormality during the access of the terminal device to the network may include any one or more of following situations: the terminal device attempts to access the network via contention free RACH resources (e.g., contention free RACH resources linked to specific SSB/CSI-RS configured in handover or beam failure recovery case) but does not succeed, and attempts to access the network via other contention free RACH resources or contention based RACH resources but succeeds; when the terminal device accesses the network via contention free RACH resources (e.g., contention free RACH resources linked to specific SSB/CSI-RS), the terminal device switches to another beam within a time period no longer than a first threshold; and when the terminal device accesses the network via contention free and/or contention based RACH resources, radio link failure (RLF) occurs within a time period no longer than a second threshold.

Herein, the values of the first threshold and the second threshold may be greater than or equal to 0. When the first threshold is 0, it means that the terminal device switches to another beam immediately following the access of the terminal device to the network via contention free RACH resources. When the second threshold is 0, it means that the RLF occurs immediately following the access of the terminal device to the network via contention free and/or contention based RACH resources.

In action 240, the terminal device reports the resource information to the network device.

In an exemplary implementation, the resource information of the RACH on which the access of the terminal device to the network has abnormality, which is stored by the terminal device, may be reported by the terminal device to the network device. The reported resource information may include any one or more pieces of following information: contention free RACH resources used in the access of the terminal device to the network which has abnormality; contention based RACH resources used in the access of the terminal device to the network which has abnormality; one or more SSB/CSI-RS indexes corresponding to RACH resources used in the access of the terminal device to the network which has abnormality; and measurement result of any one or more of reference signal received power (RSRP), reference signal received quality (RSRQ), and signal to noise ratio (SNR), of a cell or a beam, during the access of the terminal device to the network which has abnormality.

In an exemplary implementation, the terminal device may report the resource information to the network device once the abnormality occurs. For example, whenever the terminal device encounters abnormality during access to the network via an RACH, the terminal device stores and reports resource information of the RACH to the network device.

Alternatively, the terminal device may report the resource information to the network device when the number of times that the abnormality occurs reaches a third threshold. The third threshold may be a positive integer. For example, the terminal device may not immediately report the resource information of an RACH once abnormality occurs during the access of the terminal device to the network via the RACH, but only report the resource information of the RACH if the abnormality occurs repeatedly and the number of times that the abnormality occurs reaches the third threshold.

Further, in an exemplary implementation, the terminal device may also store and report any one or more pieces of following information to the network device: position information of the terminal device when the abnormality occurs, and time information when the abnormality occurs. The position information may be, for example, Global Navigation Satellite System (GNSS) information or cell information. The time information may be the time when the abnormality occurs. The position information and/or time information may be reported together with the resource information, or may be reported separately, which is not restricted in implementations of the present disclosure. In an example, the resource information, the position information, and/or the time information may be reported by the terminal device via, but not limited to, the UE Assistance Info or Failure Information in an NR system, but implementations of the present disclosure are not restricted to this.

In an exemplary implementation, as shown in FIG. 2, after the terminal device stores the resource information of the RACH on which access of the terminal device to the network has abnormality, the terminal device may send an indication for indicating that the resource information is stored in the terminal device to the network device (action 220). Herein, the indication may be a general indication for indicating that the terminal device has information stored in it. Or, the indication may be a specific indication for indicating that the terminal device has information related to abnormality during the access of the terminal device to the network via an RACH stored in it, or even the indication may be a specific indication for indicating that the terminal device has information related to abnormality and in which case, e.g. beam failure recovery, handover, etc., did the abnormality happen. The indication may be sent during a connection setup procedure or connection reestablishment procedure or connection resume procedure, and in particular, the indication may be carried in any one of following messages: a connection setup request (e.g., RRCSetupRequest), a connection setup complete message (e.g., RRCSetupComplete), a connection reestablishment request (e.g., RRCReestablishmentRequest), a connection reestablishment complete message (e.g., RRCReestablishmentComplete), a connection resume request (e.g., RRCResumeRequest), and a connection resume complete message (e.g., RRCResumeComplete). The message may be sent during the re-access of the terminal device to the network.

In an exemplary implementation, as shown in FIG. 2, the network device may send an instruction to report the resource information to the terminal device (action 230). For example, the network device may send the instruction to report the resource information to the terminal device after receiving the indication for indicating that the resource information is stored in the terminal device from the terminal device, so that the terminal device may report the resource information to the network device according to the instruction. Alternatively, the network device may send the instruction to report the resource information periodically.

For example, the network device may send the instruction to report the resource information periodically regardless of whether the indication for indicating that the resource information is stored in the terminal device is received or not, and if the terminal device receives the instruction and has stored the resource information, the terminal device will report the resource information to the network device.

In exemplary implementations of the present disclosure, the information reported by the terminal device to the network device may enable the network device to be aware that there may be a problem with contention free RACH resources and/or contention based RACH resources, so that the network device may adjust or improve corresponding RACH resource configuration to improve the efficiency and/or effectiveness of the access of the terminal device to the network.

Figure 3:
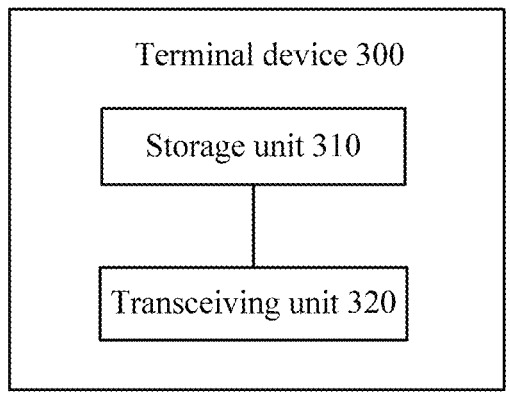
FIG. 3 is a schematic diagram of a terminal device according to an exemplary implementation of the present disclosure.

FIG. 3 shows a schematic diagram of a terminal device 300 according to an exemplary implementation of the present disclosure. As shown in FIG. 3, the terminal device 300 may include a storage unit 310 and a transceiving unit 320.

The storage unit 310 may be configured to store resource information of an RACH on which access of the terminal device to a network has abnormality. The transceiving unit 320 may be configured to report the resource information to a network device.

In an exemplary implementation, the transceiving unit 320 may be further configured to send an indication for indicating that the resource information is stored in the terminal device to the network device during a connection setup procedure or connection reestablishment procedure or connection resume procedure.

In an exemplary implementation, the indication may be included in any one of following messages: a connection setup request, a connection setup complete message, a connection reestablishment request, a connection reestablishment complete message, a connection resume request, and a connection resume complete message.

In an exemplary implementation, the transceiving unit 320 may be further configured to receive an instruction to report the resource information sent by the network device, before reporting the resource information to the network device.

In an exemplary implementation, the abnormality during the access of the terminal device to the network may include any one or more of the following situations: the terminal device attempts to access the network via contention free RACH resources but does not succeed, and attempts to access the network via other contention free RACH resources or contention based RACH resources but succeeds; when the terminal device accesses the network via contention free RACH resources, the terminal device switches to another beam within a time period no longer than a first threshold; and when the terminal device accesses the network via contention free and/or contention based RACH resources, RLF occurs within a time period no longer than a second threshold. Herein, the values of the first threshold and the second threshold may be greater than or equal to 0.

In an exemplary implementation, the resource information reported by the terminal device may include one or more pieces of following information: contention free RACH resources used in the access of the terminal device to the network which has abnormality; contention based RACH resources used in the access of the terminal device to the network which has abnormality; one or more SSB/CSI-RS indexes corresponding to RACH resources used in the access of the terminal device to the network which has abnormality; and measurement result of any one or more of RSRP, RSRQ, and SNR, of a cell or a beam, during the access of the terminal device to the network which has abnormality.

In an exemplary implementation, the transceiving unit 320 may be configured to report the resource information to the network device once the abnormality occurs.

In an exemplary implementation, the transceiving unit 320 may be configured to report the resource information to the network device when the number of times that the abnormality occurs reaches a third threshold. The third threshold may be a positive integer.

In an exemplary implementation, the transceiving unit 320 may be further configured to report one or more pieces of following information to the network device: position information of the terminal device when the abnormality occurs; and time information when the abnormality occurs.

It should be understood that the terminal device 300 in the above exemplary implementations may correspond to the terminal device in the exemplary implementations relating to the method of FIG. 2, and the operations and/or functions of the various units in the terminal device 300 are respectively for the purpose of implementing corresponding actions of the terminal device in the exemplary method implementations relating to FIG. 2, and relevant details and technical effects may refer to those described in the exemplary method implementations and will not be repeated here for conciseness.

Figure 4:
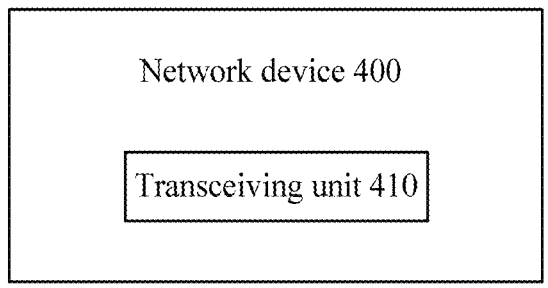
FIG. 4 is a schematic diagram of a network device according to an exemplary implementation of the present disclosure.

FIG. 4 shows a schematic diagram of a network device 400 according to an exemplary implementation of the present disclosure. As shown in FIG. 4, the network device 400 may include a transceiving unit 410.

The transceiving unit 410 may be configured to receive resource information of an RACH on which access of a terminal device to a network has abnormality, reported by the terminal device.

In an exemplary implementation, the transceiving unit 410 may be further configured to receive an indication for indicating that the resource information is stored in the terminal device sent by the terminal device during a connection setup procedure or connection reestablishment procedure or connection resume procedure.

In an exemplary implementation, the indication may be included in any one of following messages: a connection setup request, a connection setup complete message, a connection reestablishment request, a connection reestablishment complete message, a connection resume request, and a connection resume complete message.

In an exemplary implementation, the transceiving unit 410 may be further configured to send an instruction to report the resource information to the terminal device, before receiving the resource information reported by the terminal device.

In an exemplary implementation, the transceiving unit 410 may be configured to send the instruction to report the resource information to the terminal device after receiving the indication for indicating that the resource information is stored in the terminal device from the terminal device.

In an exemplary implementation, the transceiving unit 410 may be configured to send the instruction to report the resource information to the terminal device periodically.

In an exemplary implementation, the abnormality during the access of the terminal device to the network may include any one or more of the following situations: the terminal device attempts to access the network via contention free RACH resources but does not succeed, and attempts to access the network via other contention free RACH resources or contention based RACH resources but succeeds; when the terminal device accesses the network via contention free RACH resources, the terminal device switches to another beam within a time period no longer than a first threshold; and when the terminal device accesses the network via contention free and/or contention based RACH resources, RLF occurs within a time period no longer than a second threshold. Herein, the values of the first threshold and the second threshold may be greater than or equal to 0.

In an exemplary implementation, the resource information reported by the terminal device may include one or more pieces of following information: contention free RACH resources used in the access of the terminal device to the network which has abnormality; contention based RACH resources used in the access of the terminal device to the network which has abnormality; one or more SSB/CSI-RS indexes corresponding to RACH resources used in the access of the terminal device to the network which has abnormality; and measurement result of any one or more of RSRP, RSRQ, and SNR, of a cell or a beam, during the access of the terminal device to the network which has abnormality.

In an exemplary implementation, the transceiving unit 410 may be further configured to receive one or more pieces of following information reported by the terminal device: position information of the terminal device when the abnormality occurs; and time information when the abnormality occurs.

It should be understood that the network device 400 in the above exemplary implementations may correspond to the network device in the exemplary implementations relating to the method of FIG. 2, and the operations and/or functions of the various units in the network device 400 are respectively for the purpose of implementing corresponding actions of the network device in the exemplary method implementations relating to FIG. 2, and relevant details and technical effects may refer to those described in the exemplary method implementations and will not be repeated here for conciseness.

Figure 5:
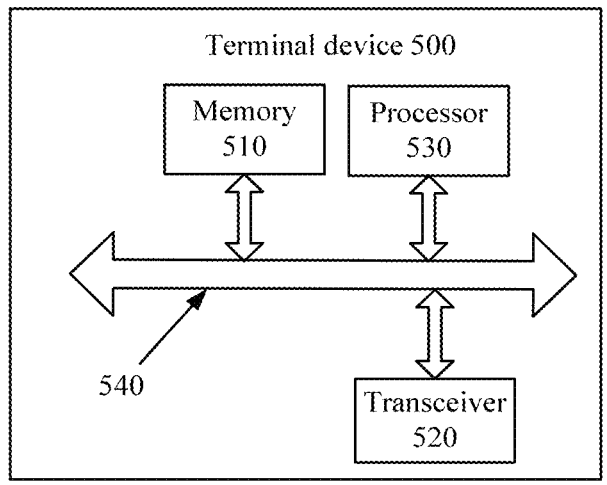
FIG. 5 is a schematic diagram of structure of a terminal device according to an exemplary implementation of the present disclosure.

FIG. 5 shows a schematic diagram of structure of a terminal device 500 according to an exemplary implementation of the present disclosure. As shown in FIG. 5, the terminal device 500 may include a memory 510 and a transceiver 520. The terminal device 500 may further include a processor 530. The memory 510 may be used for storing data and/or information. The memory 510 may be further used for storing instructions executable by the processor 530, and the processor 530 may be used for executing the instructions stored in the memory 510 to control the transceiver 520 to receive and/or send signals. Particularly, functions of the aforementioned storage unit 310 may be implemented by the memory 510, and functions of the aforementioned transceiving unit 320 may be implemented by the transceiver 520 under the control of the processor 530. The terminal device 500 may further include a bus system 540, which may be used for connecting the components, such as the memory 510, the transceiver 520, and the processor 530, of the terminal device 500.

Herein, it should be understood that the memory 510 may include a read only memory and a random access memory, and may provide instructions and data to the processor 530. A portion of the memory 510 may further include a non-volatile random access memory. For example, the memory 510 may further store device type information and/or other information.

The processor 530 may be a central processing unit (CPU) or another general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 540 may include, in addition to a data bus, a power bus, a control bus, a status signal bus, etc. However, for the sake of clarity, various buses are illustrated as the bus system 540 in FIG. 5.

The various actions of the terminal device in the exemplary implementations relating to the method of FIG. 2 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 510, and the processor 530 may read the information in the memory 510 and control the transceiver 520 to send and/or receive signals.

The memory 510 may be configured to store resource information of an RACH on which access of the terminal device to a network has abnormality. The transceiver 520 may be configured to report the resource information to a network device.

In an exemplary implementation, the transceiver 520 may be further configured to send an indication for indicating that the resource information is stored in the terminal device to the network device during a connection setup procedure or connection reestablishment procedure or connection resume procedure.

In an exemplary implementation, the indication may be included in any one of following messages: a connection setup request, a connection setup complete message, a connection reestablishment request, a connection reestablishment complete message, a connection resume request, and a connection resume complete message.

In an exemplary implementation, the transceiver 520 may be further configured to receive an instruction to report the resource information sent by the network device, before reporting the resource information to the network device.

In an exemplary implementation, the abnormality during the access of the terminal device to the network may include any one or more of the following situations: the terminal device attempts to access the network via contention free RACH resources but does not succeed, and attempts to access the network via other contention free RACH resources or contention based RACH resources but succeeds; when the terminal device accesses the network via contention free RACH resources, the terminal device switches to another beam within a time period no longer than a first threshold; and when the terminal device accesses the network via contention free and/or contention based RACH resources, RLF occurs within a time period no longer than a second threshold. Herein, the values of the first threshold and the second threshold may be greater than or equal to 0.

In an exemplary implementation, the resource information reported by the terminal device may include one or more pieces of following information: contention free RACH resources used in the access of the terminal device to the network which has abnormality; contention based RACH resources used in the access of the terminal device to the network which has abnormality; one or more SSB/CSI-RS indexes corresponding to RACH resources used in the access of the terminal device to the network which has abnormality; and measurement result of any one or more of RSRP, RSRQ, and SNR, of a cell or a beam, during the access of the terminal device to the network which has abnormality.

In an exemplary implementation, the transceiver 520 may be configured to report the resource information to the network device once the abnormality occurs.

In an exemplary implementation, the transceiver 520 may be configured to report the resource information to the network device when the number of times that the abnormality occurs reaches a third threshold. The third threshold may be a positive integer.

In an exemplary implementation, the transceiver 520 may be further configured to report one or more pieces of following information to the network device: position information of the terminal device when the abnormality occurs; and time information when the abnormality occurs.

It should be understood that the terminal device 500 in the above exemplary implementations may correspond to the terminal device in the exemplary implementations relating to the method of FIG. 2. The terminal device 500 may implement corresponding actions of the terminal device in the exemplary method implementations relating to FIG. 2, and relevant details and technical effects may refer to those described in the exemplary method implementations and will not be repeated here for conciseness.

Figure 6:
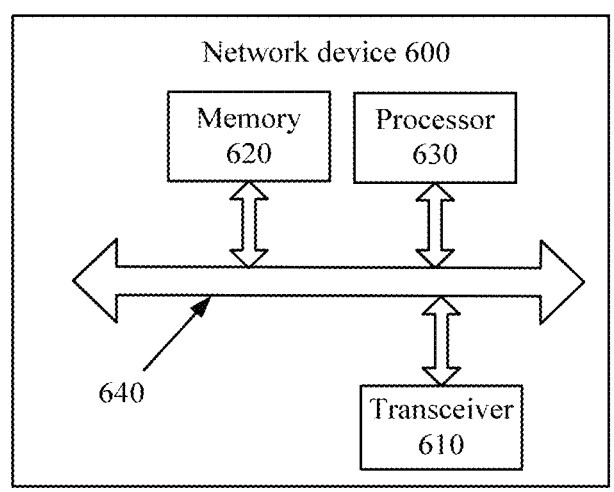
FIG. 6 is a schematic diagram of structure of a network device according to an exemplary implementation of the present disclosure.

FIG. 6 shows a schematic diagram of structure of a network device 600 according to an exemplary implementation of the present disclosure. As shown in FIG. 6, the network device 600 may include a transceiver 610. The network device 600 may further include a memory 620 and a processor 630. The memory 620 may be used for storing instructions executable by the processor 630, and the processor 630 may be used for executing the instructions stored in the memory 620 to control the transceiver 610 to receive and/or send signals. Particularly, functions of the aforementioned transceiving unit 410 may be implemented by the transceiver 610 under the control of the processor 630. The network device 600 may further include a bus system 640, which may be used for connecting the components, such as the transceiver 610, the memory 620, and the processor 630, of the network device 600.

Herein, it should be understood that the memory 620 may include a read only memory and a random access memory, and may provide instructions and data to the processor 630. A portion of the memory 620 may further include a non-volatile random access memory. For example, the memory 620 may further store device type information and/or other information.

The processor 630 may be a central processing unit (CPU) or another general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 640 may include, in addition to a data bus, a power bus, a control bus, a status signal bus, etc. However, for the sake of clarity, various buses are illustrated as the bus system 640 in FIG. 6.

The various actions of the network device in the exemplary implementations relating to the method of FIG. 2 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 620, and the processor 630 may read the information in the memory 620 and control the transceiver 610 to send and/or receive signals.

The transceiver 610 may be configured to receive resource information of an RACH on which access of a terminal device to a network has abnormality, reported by the terminal device.

In an exemplary implementation, the transceiver 610 may be further configured to receive an indication for indicating that the resource information is stored in the terminal device sent by the terminal device during a connection setup procedure or connection reestablishment procedure or connection resume procedure.

In an exemplary implementation, the indication may be included in any one of following messages: a connection setup request, a connection setup complete message, a connection reestablishment request, a connection reestablishment complete message, a connection resume request, and a connection resume complete message.

In an exemplary implementation, the transceiver 610 may be further configured to send an instruction to report the resource information to the terminal device, before receiving the resource information reported by the terminal device.

In an exemplary implementation, the transceiver 610 may be configured to send the instruction to report the resource information to the terminal device after receiving the indication for indicating that the resource information is stored in the terminal device from the terminal device.

In an exemplary implementation, the transceiver 610 may be configured to send the instruction to report the resource information to the terminal device periodically.

In an exemplary implementation, the abnormality during the access of the terminal device to the network may include any one or more of the following situations: the terminal device attempts to access the network via contention free RACH resources but does not succeed, and attempts to access the network via other contention free RACH resources or contention based RACH resources but succeeds; when the terminal device accesses the network via contention free RACH resources, the terminal device switches to another beam within a time period no longer than a first threshold; and when the terminal device accesses the network via contention free and/or contention based RACH resources, RLF occurs within a time period no longer than a second threshold. Herein, the values of the first threshold and the second threshold may be greater than or equal to 0.

In an exemplary implementation, the resource information reported by the terminal device may include one or more pieces of following information: contention free RACH resources used in the access of the terminal device to the network which has abnormality; contention based RACH resources used in the access of the terminal device to the network which has abnormality; one or more SSB/CSI-RS indexes corresponding to RACH resources used in the access of the terminal device to the network which has abnormality; and measurement result of any one or more of RSRP, RSRQ, and SNR, of a cell or a beam, during the access of the terminal device to the network which has abnormality.

In an exemplary implementation, the transceiver 610 may be further configured to receive one or more pieces of following information reported by the terminal device: position information of the terminal device when the abnormality occurs; and time information when the abnormality occurs.

It should be understood that the network device 600 in the above exemplary implementations may correspond to the network device in the exemplary implementations relating to the method of FIG. 2. The network device 600 may implement corresponding actions of the network device in the exemplary method implementations relating to FIG. 2, and relevant details and technical effects may refer to those described in the exemplary method implementations and will not be repeated here for conciseness.

It should be understood that in various implementations of the present disclosure, the term "and/or" is used to describe an association relationship between associated objects, indicating that there may be three relationships, for example, a and/or b may indicate three situations: A alone, A and B, and B alone. In addition, the symbol "/" in the present disclosure generally indicates that objects of the former and the latter connected by "/" has an "or" relationship.

Those skilled in the art should understand that the elements and actions in the various implementations disclosed herein can be implemented in electronic hardware, computer software, or a combination of the electronic hardware and the computer software. In order to clearly illustrate the interchangeability of hardware and software, the composition and actions in the implementations have been described in general terms by functions in the above description. Whether these functions are performed in hardware or software depends on the specific application and design constraints of the technical solution. Skilled artisans may use different methods to implement the described functions for each particular application, but such implementation should not be considered to be beyond the scope of the present disclosure.

Those skilled in the art should understand that the specific working processes of the devices and units described above may correspond to the corresponding processes in the method implementations and may not be repeated for convenience and conciseness of description.

In various implementations of the present disclosure, it should be understood that the disclosed methods and devices may be implemented in other ways. For example, the device implementations described above are merely illustrative, the division of units is only a logical function division, and there may be other ways of division in actual implementations. For example, multiple units or components may be combined or integrated into another system, or some features may be ignored or not executed. In addition, the coupling or communication connection between the elements shown or discussed may be a direct coupling or indirect coupling, or communication connection through some interface, device or unit, or may be an electrical, mechanical or other form of connection.

The units described as separate units may or may not be physically separated, and the unit may or may not be a physical unit, i.e., it may be located in one place or may be distributed over multiple network units. Some or all of the elements can be selected according to actual needs to achieve the purpose of the implementations of the present disclosure.

In addition, various units in various implementations of the present disclosure may be integrated in one processing module, or the various units may be physically separate, or two or more units may be integrated in one module. The units can be implemented in the form of hardware or software functional modules.

The units may be stored in a computer readable storage medium if they are implemented in the form of software function modules and sold or used as an independent product. Based on such understanding, the technical solutions of the present disclosure may be embodied in the form of a software product, which is stored in a storage medium and includes instructions for causing a computer device (which may be a personal computer, a server, a terminal device, or a network device, etc.) to perform all or part of the actions of the method in various implementations of the present disclosure. The storage media may include a U disk, a mobile hard disk, a read-only memory, a random access memory, a magnetic disk, an optical disk, or other media capable of storing program codes.

What are described above are merely exemplary implementations of the present disclosure. Although the exemplary implementations have been described in considerable detail above, numerous variations and modifications will become apparent to those skilled in the art once the above disclosure is fully appreciated. It is intended that the following claims be interpreted to embrace all such variations and modifications.

What is claimed is:

1. A method for reporting information, comprising:
   when a terminal device encounters abnormality during access to a network via a random access channel (RACH), storing, by the terminal device, resource information of the RACH; and
   reporting, by the terminal device, the resource information of the RACH to a network device,
   wherein the resource information of the RACH comprises contention free RACH resources used in the access of the terminal device to the network that has the abnormality and contention based RACH resources used in the access of the terminal device to the network that has the abnormality,
   wherein the abnormality during the access of the terminal device to the network comprises:
      the terminal device unsuccessfully attempts to access the network via contention free RACH resources and successfully attempts to access the network via other connection free RACH resources or contention based RACH resources, and
      when the terminal device accesses the network via contention free RACH resources, the terminal device switches to another beam within a time period less than or equal to a first threshold and radio link failure (RLF) occurs within a time period less than or equal to a second threshold,
   wherein the resource information reported by the terminal device further comprises:
      one or more synchronization signal block/channel state information reference signal (SSB/CSI-RS) indexes corresponding to RACH resources used in the access of the terminal device to the network that has abnormality; and
      measurement result of any one or more of reference signal received power (RSRP), reference signal received quality (RSRQ), and signal to noise ratio (SNR), of a cell or a beam, during the access of the terminal device to the network that has abnormality, and
   wherein reporting, by the terminal device, the resource information to the network device comprises:
      reporting, by the terminal device, the resource information to the network device when a number of times that the abnormality occurs reaches a third threshold.

2. The method according to claim 1, further comprising: sending, by the terminal device, an indication for indicating that the resource information is stored in the terminal device to the network device.

3. The method according to claim 2, wherein the indication is included in any one of following messages: a connection setup request, a connection setup complete message, a connection reestablishment request, a connection reestablishment complete message, a connection resume request, and a connection resume complete message.

4. The method according to claim 1, further comprising:
   reporting, by the terminal device, one or more pieces of following information to the network device:
      position information of the terminal device when the abnormality occurs; and
      time information when the abnormality occurs.

5. The method according to claim 1, wherein before reporting, by the terminal device, the resource information to the network device, the method further comprises:
   receiving, by the terminal device, an instruction to report the resource information sent by the network device.

6. A network device, comprising:
   a transceiver;
   a memory used for storing instructions; and
   a processor used for executing the instructions stored in the memory to control the transceiver to receive resource information of a random access channel (RACH) on which access of a terminal device to a network has abnormality, reported by the terminal device when a number of times that the abnormality occurs reaches a third threshold,
   wherein the resource information of the RACH comprises contention free RACH resources used in the access of the terminal device to the network that has the abnormality and contention based RACH resources used in the access of the terminal device to the network that has the abnormality, and
   wherein the abnormality during the access of the terminal device to the network comprises:
      the terminal device unsuccessfully attempts to access the network via contention free RACH resources and successfully attempts to access the network via other connection free RACH resources or contention based RACH resources, and
      when the terminal device accesses the network via contention free RACH resources, the terminal device switches to another beam within a time period less than or equal to a first threshold and radio link failure (RLF) occurs with a time period less than or equal to a second threshold,
   wherein the resource information reported by the terminal device further comprises:
      one or more synchronization signal block/channel state information reference signal (SSB/CSI-RS) indexes corresponding to RACH resources used in the access of the terminal device to the network that has abnormality; and
      measurement result of any one or more of reference signal received power (RSRP), reference signal received quality (RSRQ), and signal to noise ratio (SNR), of a cell or a beam, during the access of the terminal device to the network that has abnormality.

7. The network device according to claim 6, wherein the processor is further used for executing the instructions stored in the memory to control the transceiver to receive an indication for indicating that the resource information is stored in the terminal device sent by the terminal device.

8. The network device according to claim 7, wherein the indication is included in any one of following messages: a connection setup request, a connection setup complete message, a connection reestablishment request, a connection reestablishment complete message, a connection resume request, and a connection resume complete message.

9. The network device according to claim 6, wherein the processor is further used for executing the instructions stored in the memory to control the transceiver, before receiving the resource information reported by the terminal device, to:
send an instruction to report the resource information to the terminal device after receiving an indication for indicating that the resource information is stored in the terminal device from the terminal device; or,
send the instruction to report the resource information to the terminal device periodically.

10. A terminal device, comprising: a processor, a memory, and a transceiver,
wherein the memory is configured to store resource information of a random access channel (RACH) when the terminal device encounters abnormality during access to a network via the RACH,
wherein the processor is configured to control the transceiver to report the resource information of the RACH to the network device,
wherein the resource information of the RACH comprises contention free RACH resources used in the access of the terminal device to the network that has the abnormality and contention based RACH resources used in the access of the terminal device to the network that has the abnormality, and
wherein the abnormality during the access of the terminal device to the network comprises:
the terminal device unsuccessfully attempts to access the network via contention free RACH resources and successfully attempts to access the network via other connection free RACH resources or contention based RACH resources, and
when the terminal device accesses the network via contention free RACH resources, the terminal device switches to another beam within a time period less than or equal to a first threshold and radio link failure (RLF) occurs within a time period less than or equal to a second threshold,
wherein the resource information reported by the terminal device further comprises:
one or more synchronization signal block/channel state information reference signal (SSB/CSI-RS) indexes corresponding to RACH resources used in the access of the terminal device to the network that has abnormality; and
measurement result of any one or more of reference signal received power (RSRP), reference signal received quality (RSRQ), and signal to noise ratio (SNR), of a cell or a beam, during the access of the terminal device to the network that has abnormality,
wherein the processor is further configured to control the transceiver to report the resource information to the network device when a number of times that the abnormality occurs reaches a third threshold.

11. The terminal device according to claim 10, wherein the processor is further configured to control the transceiver to send an indication for indicating that the resource information is stored in the terminal device to the network device.

12. The terminal device according to claim 11, wherein the indication is included in any one of following messages: a connection setup request, a connection setup complete message, a connection reestablishment request, a connection reestablishment complete message, a connection resume request, and a connection resume complete message.

13. The terminal device according to claim 10, wherein the processor is further configured to control the transceiver to report one or more pieces of following information to the network device:
position information of the terminal device when the abnormality occurs; and
time information when the abnormality occurs.

14. The terminal device according to claim 10, wherein the processor is further configured to control the transceiver to receive an instruction to report the resource information sent by the network device.

* * * * *